US011010523B1

(12) United States Patent
Huang et al.

(10) Patent No.: US 11,010,523 B1
(45) Date of Patent: May 18, 2021

(54) PREDICTION OF TEST PATTERN COUNTS FOR SCAN CONFIGURATION DETERMINATION

(71) Applicant: Mentor Graphics Corporation, Wilsonville, OR (US)

(72) Inventors: Yu Huang, West Linn, OR (US); Janusz Rajski, West Linn, OR (US); Mark A. Kassab, Wilsonville, OR (US); Wu-Tung Cheng, Lake Oswego, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/846,573

(22) Filed: Apr. 13, 2020

(51) Int. Cl.
*G06F 30/333* (2020.01)
*G06F 17/18* (2006.01)
*G06F 119/02* (2020.01)

(52) U.S. Cl.
CPC ............ *G06F 30/333* (2020.01); *G06F 17/18* (2013.01); *G06F 2119/02* (2020.01)

(58) Field of Classification Search
CPC ..... G06F 30/333; G06F 17/18; G06F 2119/02
See application file for complete search history.

(56) References Cited

U.S. PATENT DOCUMENTS

| 9,088,522 | B2 | 7/2015 | Rajski et al. | |
| 2007/0011530 | A1* | 1/2007 | Rajski | G01R 31/31813 714/728 |
| 2013/0290795 | A1* | 10/2013 | Rajski | G01R 31/318335 714/712 |
| 2015/0285854 | A1* | 10/2015 | Kassab | G01R 31/2834 702/58 |
| 2019/0311290 | A1 | 10/2019 | Huang et al. | |

OTHER PUBLICATIONS

F. Tsai et al., "Efficient Prognostication of Pattern Count with Different Input Compression Ratios," 2020 IEEE European Test Symposium (ETS), Tallinn, Estonia, 2020, pp. 1-2, doi: 10.1109/ ETS48528.2020.9131586. (Year: 2020).*
Wu-Tung Cheng et al., "Deep Learning Based Test Compression Analyzer", 2019 IEEE 28th Asian Test Symposium (ATS), Dec. 10-13, 2019, pp. 1-10.
M. Kassab et al., "Dynamic Channel Allocation for Higher EDT Compression in SoC Designs," 2010 IEEE International Test Conference, Paper 9.2, 2010, pp. 1-10.
J. Janicki et al., "EDT Channel Bandwidth Management in SoC Designs with Pattern-Independent Test Access Mechanism," 2011 IEEE International Test Conference, Paper 14.1, 2011, pp. 1-9.

* cited by examiner

*Primary Examiner* — Stacy Whitmore

(57) ABSTRACT

One, two, or three test pattern generation and encoding processes are performed for a circuit design to generate compressed test patterns for one or two input channel numbers. The one, two, or three test pattern generation and encoding processes are configured to minimize active input channels for each of the compressed test patterns. A test pattern count for each of a plurality of input channel numbers is determined based on the compressed test patterns for the one or two input channel numbers, a number of active input channels for each of the compressed test patterns, and an assumption of similar input data volumes for different numbers of input channels. The test pattern count information can be employed to determine an optimal number of input channels for a test decompressor.

22 Claims, 9 Drawing Sheets

Flow chart 400

| Original Pattern Histogram | | | | Step 910 | |
|---|---|---|---|---|---|
| #Used Channels | #Patterns | Data Volume | | #Patterns | Data Volume |
| 1 | 26 | 26 (0.034%) | | 26 | 26 |
| 2 | 4? | 94 (0.121%) | | 4? | 94 |
| 3 | 25763 | 77289 (99.84%) | | 25763 | 77289 |
| SUM | 25836 | 77409 | | 25836 | 66727 |

| Step 920 | | | | Step 930 | |
|---|---|---|---|---|---|
| 1 | 26 | 22 | | 22 | 22 |
| 2 | 4? | 83 | | 41 | 81 |
| 3 | 25763 | 66634 | | 22308 | 66634 |
| SUM | 25836 | 66727 | | 22371 | 66727 |

PREDICTION OF TEST PATTERN COUNTS FOR SCAN CONFIGURATION DETERMINATION

FIELD OF THE DISCLOSED TECHNIQUES

The presently disclosed techniques relates to circuit testing. Various implementations of the disclosed techniques may be particularly useful for determining optimal test circuitry configuration.

BACKGROUND OF THE DISCLOSED TECHNIQUES

Design complexity keeps increasing. A design often can have over 1 billion gates, 100 million scan cells, and/or hundreds of cores. New technology such as fin field-effect transistor (FinFET) and extreme ultraviolet (EUV) lithography requires new fault models and thus more test patterns for circuit testing. To reduce test costs, various on-chip compression schemes have been developed. A test pattern compression/encoding method typically takes advantage of low test pattern fill rates to generate compressed test patterns along with automatic test pattern generation (ATPG). In these schemes, a tester delivers compressed test patterns by using a small number of inputs (also referred to as input channels) while an on-chip decompressor expands them into data to be loaded into a large number of scan chains. A compactor is used to compact test responses shifted out from the internal scan chains to a small number of outputs (also referred to as output channels).

Although test compression techniques can significantly reduce the test cost, they may also complicate the design-for-test (DFT) planning by introducing more parameters. Not only the number of scan chains to be inserted into a design needs to be carefully determined, but the selection of the numbers of input/output channels can also have an impact on test coverage and test data volume. A conventional test compression analyzer employs a brute force "trial-and-error" technique. First, users provide multiple sets of parameters. The conventional test compression analyzer emulates the design by changing test configurations based on each of the sets of parameters. Test pattern generation and encoding processes are then performed to obtain accurate test coverage and pattern count, power metrics, etc. for each of the test configurations. Then users can either select the best configuration based on test coverage and test data volume or continue searching for new configurations until they are satisfied. This flow is time-consuming because a test pattern generation process is slow for large circuits. A way to tradeoff could be running test pattern generation with fault sampling, but this compromises analytical accuracy.

BRIEF SUMMARY OF THE DISCLOSED TECHNIQUES

Various aspects of the disclosed technology relate to predicting pattern counts for test configuration determination. In one aspect, there is a method, executed by at least one processor of a computer, comprising: receiving a circuit design; performing one, two, or three test pattern generation and encoding processes for the circuit design to generate compressed test patterns for one or two input channel numbers, the one, two, or three test pattern generation and encoding processes configured to minimize active input channels for each of the compressed test patterns; determining a test pattern count for each of a plurality of input channel numbers based on the compressed test patterns for the one or two input channel numbers, a number of active input channels for each of the compressed test patterns, and an assumption of similar input data volumes for different numbers of input channels; and storing the test pattern count for each of the plurality of input channel numbers and test pattern counts for the one or two input channel numbers.

The method may further comprise: determining input channel number for the circuit design based on the test pattern count for each of the plurality of input channel numbers and test pattern counts for the one or two input channel numbers.

The one, two, or three test pattern generation and encoding processes may comprise two test pattern generation and encoding processes using a set of faults to achieve a targeted test coverage for two input channel numbers, respectively. The two input channel numbers may be a maximum allowable number of input channels and a minimum acceptable number of input channels. The minimum acceptable number of input channels may be derived based on a statistical analysis of the specified bits while performing the pattern generation and encoding process for the maximum allowable number of input channels.

The one, two, or three test pattern generation and encoding processes may comprise one test pattern generation and encoding process using a set of faults to achieve a targeted test coverage for a first input channel number and two test pattern generation and encoding processes for a subset of faults selected from the set of faults for the first input channel number and a second input channel number, respectively. The first input channel number may be a maximum allowable number of input channels and the second input channel number may be the minimum acceptable number of input channels.

The compressed test patterns may be encoded for EDT (embedded deterministic test)-based decompressors.

In another aspect, there are one or more non-transitory computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 9 illustrates an example of a pre-processing procedure that can be performed before using Equation (2) for the N-point-based estimation to improve prediction accuracy.

DETAILED DESCRIPTION OF THE DISCLOSED TECHNIQUES

General Considerations

Various aspects of the disclosed technology relate to predicting of pattern counts for test configuration determination. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "perform" and "determine" to describe the disclosed method or the device function/structure. Such terms are high-level descriptions. The actual operations or functions/structures that correspond to these terms will vary depending on the particular implementation and are readily discernible by one of ordinary skill in the art.

Additionally, as used herein, the term "design" is intended to encompass data describing an entire integrated circuit device. This term also is intended to encompass a smaller group of data describing one or more components of an entire device such as a portion of an integrated circuit device nevertheless.

Illustrative Operating Environment

Figure 1:
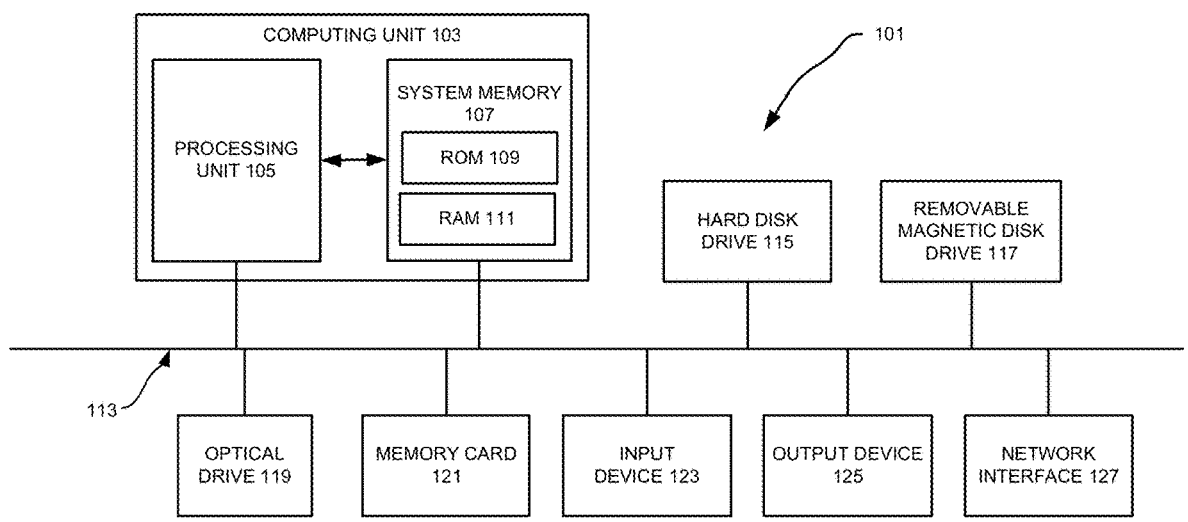
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but it will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it is not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multiprocessor computer, a plurality of single and/or multiprocessor computers arranged into a network, or some combination of both.

Design for Test, Test Pattern Generation, and Testing

The reduction in feature size increases the probability that a manufacture defect in the integrated circuit will result in a faulty chip. A very small defect can result in a faulty transistor or interconnecting wire. Even a single faulty transistor or wire can cause the entire chip to function improperly. Manufacture defects are unavoidable nonetheless, no matter whether the manufacturing process is at the prototype stage or the high-volume manufacturing stage. It is thus necessary to test chips during the manufacturing process. Diagnosing faulty chips is also needed to ramp up and to maintain the manufacturing yield.

Testing typically includes applying a set of test stimuli (test patterns) to the circuit-under-test and then analyzing responses generated by the circuit-under-test. Functional testing attempts to validate that the circuit-under-test operates according to its functional specification while structural testing tries to ascertain that the circuit-under-test has been assembled correctly from some low-level building blocks as specified in a structural netlist and that these low-level building blocks and their wiring connections have been manufactured without defect. For structural testing, it is assumed that if functional verification has shown the correctness of the netlist and structural testing has confirmed the correct assembly of the structural circuit elements, then the circuit should function correctly. Structural testing has been widely adopted at least in part because it enables the test (test pattern) generation to focus on testing a limited number of relatively simple circuit elements rather than having to deal with an exponentially exploding multiplicity of functional states and state transitions.

To make it easier to develop and apply test patterns, certain testability features are added to circuit designs, which is referred to as design for test or design for testability (DFT). Scan testing is the most common DFT method. In a basic scan testing scheme, all or most of internal sequential state elements (latches, flip-flops, et al.) in a circuit design are made controllable and observable via a serial interface. These functional state elements are usually replaced with dual-purpose state elements called scan cells. Scan cells are connected together to form scan chains—serial shift registers for shifting in test patterns and shifting out test responses. A scan cell can operate as originally intended for functional purposes (functional/mission mode) and as a unit in a scan chain for scan (scan mode). A widely used type of scan cell includes an edge-triggered flip-flop with two-way multiplexer for the data input. The two-way multiplexer is typically controlled by a single control signal called scan enable, which selects the input signal for a scan cell from either a scan signal input port or a system signal input port. The scan signal input port is typically connected to an output of another scan cell while the system signal input port is connected to the functional logic. Scan cells can serve as both a control point and an observation point. Control points can be used to set certain logic values at some locations of the circuit-under-test, exciting (activating) a fault and propagating the incorrect value to an observation point. Scan testing allows the test equipment to access gates deeply embedded through the primary inputs/outputs and/or some physical test points and can remove the need for complicated state transition sequences when trying to control or observe what is happening at some internal circuit element.

Test patterns for scan testing are typically generated through an automatic test pattern generation (ATPG) process. ATPG usually focuses on a set of faults derived from a gate-level fault model. A defect is a flaw or physical imperfection caused in a device during the manufacturing process. A fault model (or briefly a fault) is a description of how a defect alters design behavior. For a given target fault, ATPG comprises two phases: fault activation and fault propagation. Fault activation establishes a signal value at the fault site opposite that produced by the fault. Fault propagation propagates the fault effect forward by sensitizing a path from a fault site to a scan cell or a primary output. A fault at a site is said to be detected by a test pattern if a test response value captured by a scan cell or a primary output is different than the expected value. The objective of ATPG is to find a test pattern that, when applied to the circuit, enables testers to distinguish between the correct circuit behavior and the faulty circuit behavior caused by one or more particular faults. Effectiveness of ATPG is measured by the fault coverage achieved for the fault model and the number of generated vectors (test pattern counts), which should be directly proportional to test application time. Here, the fault coverage is defined as a ratio of the number of detected faults vs. the total number of faults.

The most popular fault model used in practice is the single stuck-at fault model. In this model, one of the signal lines in a circuit is assumed to be stuck at a fixed logic value, regardless of what inputs are supplied to the circuit. The stuck-at fault model is a logical fault model because no delay information is associated with the fault definition. Delay faults cause errors in the functioning of a circuit based on its timing. They are caused by the finite rise and fall time periods of the signals in the gates, as well as, the propagation delay of interconnects between the gates. Transition faults are used for their simplicity in modeling spot defects that affect delays at inputs or outputs of gates. Under scan-based tests, the transition faults are associated with an extra delay that is large enough to cause the delay of any path through the fault site to exceed the clock period. Cell internal fault models can be derived using transistor-level circuit simulations (analog simulations). This approach can pinpoint the defect location within a cell for various cell internal defects.

During the circuit design and manufacturing process, a manufacturing test screens out chips (dies) containing defects. The test itself, however, does not identify the reason for the unacceptable low or fluctuating yield that may be observed. Physical failure analysis (PFA) can inspect the faulty chip to locate the defect location(s) and to discover the root cause. The process usually includes etching away certain layers and then imaging the silicon surface by scanning electronic microscopy or focused ion beam systems. This PFA process is laborious and time consuming. To facilitate the PFA process, diagnosis (also referred to as scan diagnosis) is often employed to narrow down possible locations of the defect(s) based on analyzing the fail log (fail file, failure file). The fail log typically contains information about when (e.g., tester cycle), where (e.g., at what tester channel), and how (e.g., at what logic value) the test failed and which test patterns generate expected test responses. The layout information of the circuit design may also be employed to further reduce the number of defect suspects.

Test application in chip manufacturing test is normally performed by automatic test equipment (ATE) (a type of testers). Scan-based tests consume significant amounts of storage and test time on ATE. The data volume increases with the number of logic gates on the chip and the same holds for the number of scan cells. Yet, practical considerations and ATE specifications often limit both the number of pins available for scan in/out and the maximum scan frequency. It is highly desirable to reduce the amount of test data that need to be loaded onto ATE and ultimately to the circuit under test. Fortunately, test patterns are compressible mainly because only 1% to 5% of test pattern bits are typically specified bits (care bits) while the rest are unspecified bits (don't-care bits). Unspecified bits can take on any values with no impact on the fault coverage. Test compression may also take advantage of the fact that test cubes tend to be highly correlated. A test cube is a deterministic test pattern in which the don't-care bits are not filled by ATPG. The correlation exists because faults are structurally related in the circuit.

Various test compression techniques have been developed. In general, additional on-chip hardware before and after scan chains is inserted. The hardware (decompressor) added before scan chains is configured to decompress test stimulus coming from ATE, while the hardware (compactor) added after scan chains is configured to compact test responses captured by the scan chains. The decompressor expands the data from n tester channels to fill greater than n scan chains. The increase in the number of scan chains shortens each scan chain and thus reduces the number of clock cycles needed to shift in each test pattern. Thus, test compression can not only reduce the amount of data stored on the tester but also reduce the test time for a given test data bandwidth.

The embedded deterministic test (EDT) is one example of test compression techniques. The EDT-based compression is composed of two complementary parts: hardware that is embedded on chip, and deterministic ATPG software that generates compressed patterns that utilize the embedded hardware. The EDT hardware features a continuous-flow decompressor. The EDT compression of test cubes is performed by treating the external test data as Boolean variables. Scan cells are conceptually filled with symbolic expressions that are linear functions of input variables injected into the decompressor. In the case of a decompressor comprising a ring generator and an associated phase shifter, a set of linear equations corresponding to scan cells whose values are specified may be used. A compressed pattern can be determined by solving the system of equations. If the compressed pattern determined as such is then scanned in through the decompressor, the bits that were specified by ATPG will be generated accordingly. Unspecified bits are set to pseudorandom values based on the decompressor architecture. Additional details concerning EDT-based compression and decompression are found in J. Rajski, J. Tyszer, M. Kassab, and N. Mukherjee, "Embedded deterministic test," IEEE Trans. CAD, vol. 23, pp. 776-792, May 2004, and U.S. Pat. Nos. 6,327,687; 6,353,842; 6,539,409; 6,543,020; 6,557,129; 6,684,358; 6,708,192; 6,829,740; 6,874,109; 7,093,175; 7,111,209; 7,260,591; 7,263,641; 7,478,296; 7,493,540; 7,500,163; 7,506,232; 7,509,546; 7,523,372; 7,653,851, of which all are hereby incorporated herein by reference.

All of the above mentioned processes, design insertion for testing, test pattern generation, and logic diagnosis, are normally performed by various electronic design automation tools such as those in the Tessent family of software tools available from Mentor Graphics Corporation, Wilsonville, Oreg.

Test Pattern Encoding for Minimizing Active Input Channels

Figure 2:
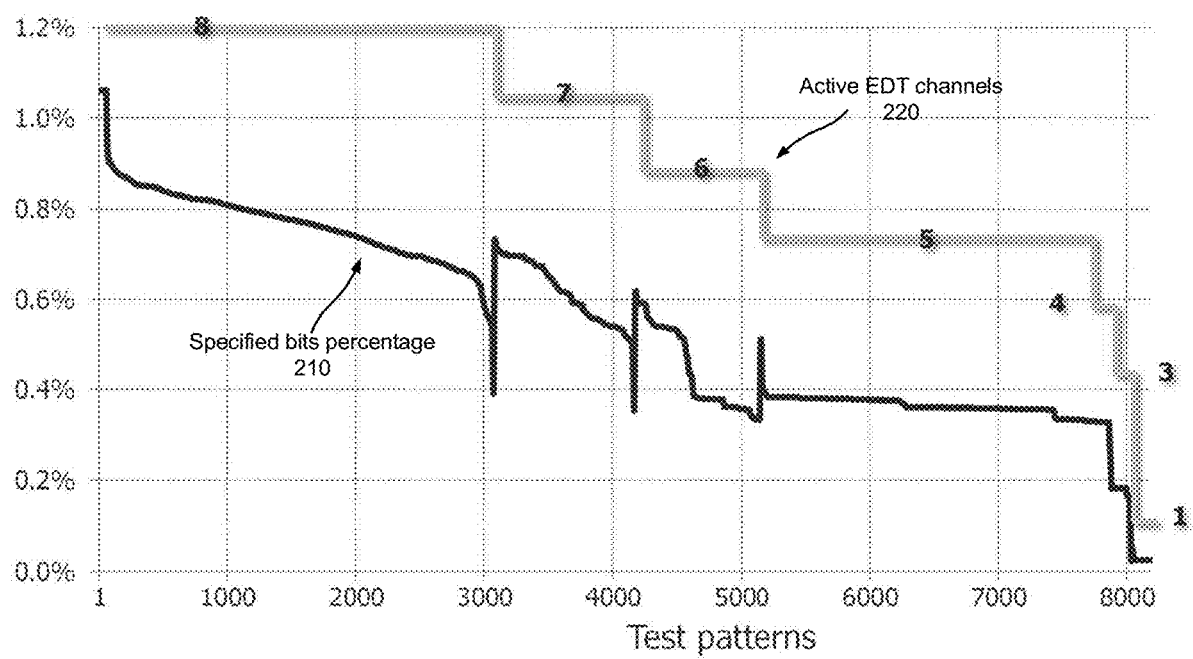
FIG. 2 illustrates an example of a test pattern specified bit profile and a test pattern count-active input channel profile.

Test patterns generated by an ATPG process can have different numbers of specified bits. FIG. 2 illustrates an example of a test pattern specified bit profile 210 and a test pattern count-active input channel profile 220. The data are obtained for an industrial design. The specified bit percentage varies between 1.1% and 0.02% for a test pattern set of more than 8,000 test patterns. In order to EDT-encode these vectors, it suffices to use not all of the available input channels (decompressor inputs), but a certain minimal number of ATE channels. These used input channels are referred to as active input channels, as illustrated in FIG. 2. For example, for the first 3000 test patterns, eight input channels are needed; and for the next 1000 test patterns, the number of active input channels is seven. Here, the active input channels can be determined for the test patterns in such a way that the corresponding test patterns remain compressible (encodable).

In the case of EDT, the number of active input channels for each test pattern can be determined using the following method. As discussed previously, EDT employs a system of linear equations to obtain a compressed test pattern. An EDT incremental solver allows merging of several test cubes that packs more specified bits into a newly created test pattern. Having done cube merging, the solver associated with a given core attempts to compress the corresponding part of a test pattern in a particular manner, as shown below.

Typically, Gaussian elimination deployed by the EDT solver determines the reduced row-echelon form of an equation system by picking leading variables in a sequence of their injections. Consider a decompressor with four inputs A, B, C, and D, and the following set of five hypothetical equations representing five specified bits:

$$d_0+a_1+d_1+a_2+a_3+d_3+c_4+d_4=1$$

$$b_0+a_1+b_1+a_2+c_2+a_4+d_4=1$$

$$b_0+c_0+d_1+a_2+b_3+d_3+a_4=1$$

$$a_0+d_0+a_1+b_1+d_1+a_2+c_2+a_4+b_4=1$$

$$a_0+d_0+b_2+d_3+a_4+b_4+d_4=1$$

where $a_i$, $b_i$, $c_i$, and $d_i$ are input variables injected during ith scan shift cycle through input channels A, B, C, and D, respectively. If selection of leading variables follows their time indexes, the above set of equations reduces to $$d_0+b_1+b_2+c_2+a_3+c_4=1$$

$$b_0+d_1+b_2+d_3+a_4=1$$

$$c_0+a_2+b_2+b_3=0$$

$$a_0+b_1+c_2+a_3+d_3+a_4+b_4+c_4+d_4=0$$

$$a_1+b_1+d_1+a_2+b_2+c_2+d_3+d_4=0$$

which implies a solution (all remaining variables are zeros)

$$d_0=1,\ b_0=1,\ c_0=0,\ a_0=0,\ a_1=0$$

As a result, all input channels are needed to provide test data and are thus active input channels. Given a set of linear equations, however, one may interchange rows or rows and columns, so as to put a particularly desirable element in a position from which the leading variable is about to be selected. This partial or full pivoting may have an important bearing on deciding how many input channels are actually needed to compress a given test pattern. Consider the example discussed above, this time, however, assume that choosing leading variables gives priority to their source channels rather than time of occurrence. It yields equations simplified as follows:

$$c_0+a_1+b_1+d_1+c_2+b_3+d_3+d_4=0$$

$$d_0+b_1+b_2+c_2+a_3+c_4=1$$

$$c_0+a_2+b_2+b_3=0$$

$$a_0+b_0+d_0+d_1+b_4+d_4=0$$

$$b_0+d_1+b_2+d_3+a_4=1$$

This approach leads to a solution $$a_1=0, a_3=1, a_2=0, a_0=0, a_4=1$$

Now, a single channel A suffices to produce a given test cube rather than four ones used by the previous method. The active channel number is thus one in this case. The above pivoting method can be used as a part of EDT encoding process, constructing the test pattern count-active input channel profile 220 shown in FIG. 2.

It should be noted that the disclosed technology is not limited to EDT-based test compression. It should be noted that the disclosed technology can use a method other than the above discussed to encode test patterns to obtain compressed test pattern having minimized active input channels.

Test Compression Analyzer

Figure 3:
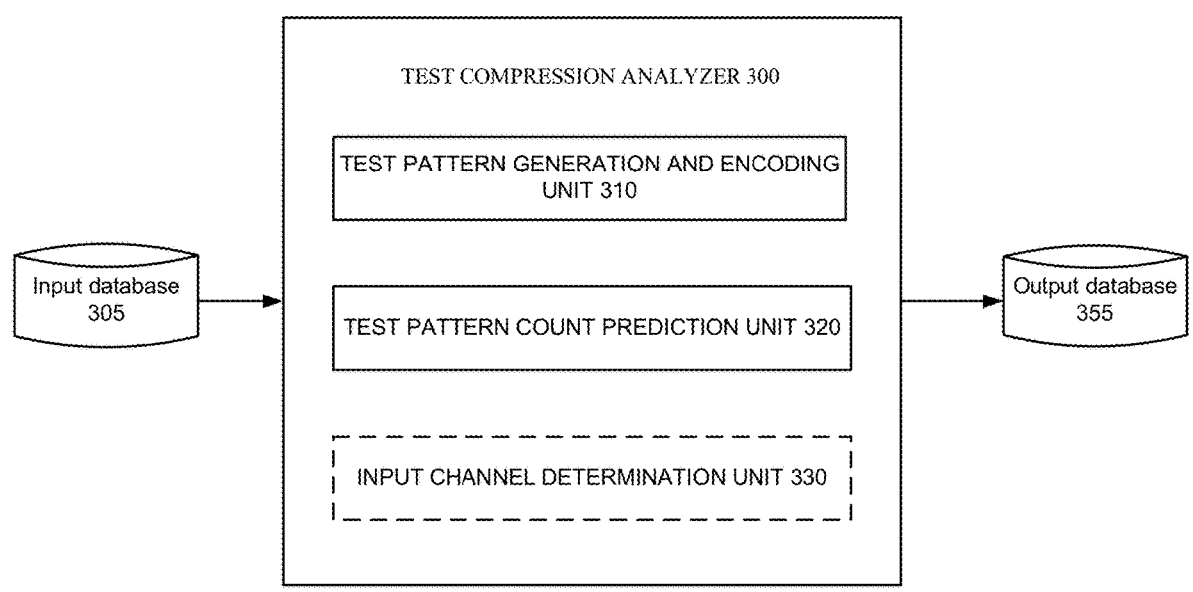
FIG. 3 illustrates an example of a test compression analyzer according to various embodiments of the disclosed technology.

FIG. 3 illustrates an example of a test compression analyzer 300 according to various embodiments of the disclosed technology. As seen in this figure, the test compression analyzer 300 includes a test pattern generation and encoding unit 310 and a test pattern count prediction unit 320. Some implementations of the test compression analyzer 300 may cooperate with (or incorporate) one or more of an input channel determination unit 330, an input database 305 and an output database 355.

As will be discussed in more detail below, the test compression analyzer 300 receives a circuit design from the input database 305. The test pattern generation and encoding unit 310 performs one, two, or three test pattern generation and encoding processes for the circuit design to generate compressed test patterns for one or two input channel numbers. The one, two, or three test pattern generation and encoding processes are configured to minimize active input channels for each of the compressed test patterns. The test pattern count prediction unit 320 determines a test pattern count for each of a plurality of input channel numbers based on the compressed test patterns for the one or two input channel numbers and a number of active input channels for each of the compressed test patterns. The determining operation assumes similar input data volumes for different numbers of input channels. The test compression analyzer 300 then stores the test pattern count for each of the plurality of input channel numbers and test pattern counts for the one or two input channel numbers in the output database 355. The input channel determination unit 330 can determine input channel number for the circuit design based on the test pattern count for each of the plurality of input channel numbers and the test pattern counts for the one or two input channel numbers.

As previously noted, various examples of the disclosed technology may be implemented by one or more computing systems, such as the computing system illustrated in FIG. 1. Accordingly, one or more of the test pattern generation and encoding unit 310, the test pattern count prediction unit 320, and the input channel determination unit 330 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the test pattern generation and encoding unit 310, the test pattern count prediction unit 320, and the input channel determination unit 330. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the test pattern generation and encoding unit 310, the test pattern count prediction unit 320, and the input channel determination unit 330 are shown as separate units in FIG. 3, a single computer (or a single processor within a master computer) or a single computer system may be used to implement some or all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

Prediction of Pattern Counts for Test Configuration Determination

Figure 4:
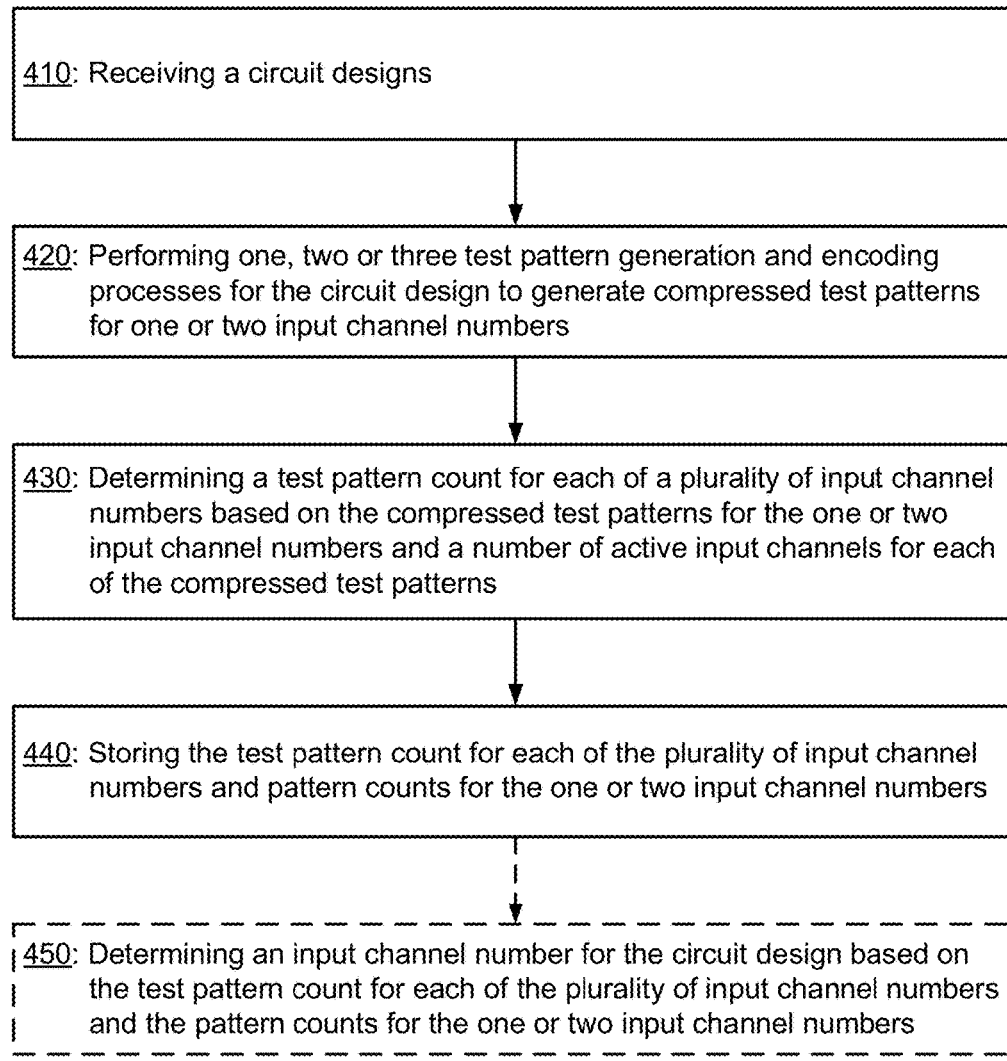
FIG. 4 illustrates a flowchart showing a process of predicting pattern counts for test configuration determination that may be implemented according to various examples of the disclosed technology.

FIG. 4 illustrates a flowchart 400 showing a process of predicting pattern counts for test configuration determination that may be implemented according to various examples of the disclosed technology. For ease of understanding, methods of pattern count prediction for test configuration determination that may be employed according to various embodiments of the disclosed technology will be described with reference to the test compression analyzer 300 in FIG. 3 and the flow chart 400 illustrated in FIG. 4. It should be appreciated, however, that alternate implementations of a test compression analyzer may be used to perform the methods of pattern count prediction for test configuration determination illustrated by the flow chart 400 according to various embodiments of the disclosed technology. Likewise, the test compression analyzer 300 may be employed to perform other methods of pattern count prediction for test configuration determination according to various embodiments of the disclosed technology.

In operation 410, the test compression analyzer 300 receives a circuit design from the input database 305. In operation 420, the test pattern generation and encoding unit 310 performs one, two, or three test pattern generation and encoding processes for the circuit design to generate compressed test patterns for one or two input channel numbers. Test pattern generation and encoding operations in a test pattern generation and encoding process may be performed together or separately. The one, two or three test pattern generation and encoding processes are configured to minimize active input channels for each of the compressed test patterns. One method to minimize active input channels for EDT-based compression is described in the section of Test Pattern Encoding For Minimizing Active Input Channels.

In some embodiments of the disclosed technology, the test pattern generation and encoding unit 310 performs two pattern generation and encoding processes for a set of faults to achieve a targeted test coverage to generate compressed test patterns for two input channel numbers. Such pattern generation and encoding processes may also be referred to as full pattern generation and encoding processes, as compared to fault-sampled pattern generation and encoding processes which use a subset of faults sampled from the set of faults. The two input channel numbers may be a user-specified maximum allowable number of input channels and one minimum acceptable number of input channels. In the case of EDT-based compression, too few input channels can lead to insufficient encoding capacity, making test cubes for some faults not encodable. These faults are referred to as not-encodable faults. Not-encodable faults are sometimes referred as EDT-aborted faults in EDT-based compression. It should be noted that a not-encodable fault may not be always not-encodable, but just not encodable in a certain setting such as those with less than the minimum acceptable number of input channels.

The test pattern generation and encoding unit 310 may determine the minimum acceptable number of input channels using a "redline prediction" procedure based on the information obtained by the test pattern encoding method discussed previously. Above a redline, the number of not-encodable faults is negligible (for example, test coverage drop<0.01% due to the not-encodable faults). The redline can be obtained by analyzing the number of specified bits in each test cube generated by ATPG. If a test cube has X specified bits when targeting a fault, but the encoding capacity (#input channels*#shift cycles per pattern for EDT) is less than X, very likely this cube becomes not-encodable and this targeted fault can be designated as a not-encodable fault. The test pattern generation and encoding unit 310 can perform a statistical analysis of the specified bits to identify the minimum acceptable number of input channels while performing the pattern generation and encoding process for the circuit design with the maximum allowable number of input channels.

In some other embodiments of the disclosed technology, the test pattern generation and encoding unit 310 performs one full test pattern generation and encoding process for a first input channel number and two fault-sampling test pattern generation and encoding processes for the first input channel number and a second input channel number, respectively. The first input channel number may be a user-specified maximum allowable number of input channels and the second input channel number may be the minimum acceptable number of input channels described above. A test pattern generation and encoding process for a subset of faults can be performed much faster than a test pattern generation and encoding processes for a full set of faults. Assuming the subset of faults is 10% of the full set of faults, for example, one full process and two fault-sampling processes can reduce more than 40% of the computing time for two full processes.

In still some other embodiments of the disclosed technology, the test pattern generation and encoding unit 310 performs one test pattern generation and encoding process for a set of faults to achieve a targeted test coverage (a full process) for a input channel number. The input channel number may be a user-specified maximum allowable number of input channels or a number between the user-specified maximum allowable number of input channels and the minimum acceptable number of input channels. In further still some other embodiments of the disclosed technology, the test pattern generation and encoding unit 310 performs two fault-sampling processes test pattern generation and encoding processes for two input channel numbers, respectively. The two input channel numbers may be a user-specified maximum allowable number of input channels and the minimum acceptable number of input channels.

Figure 5:
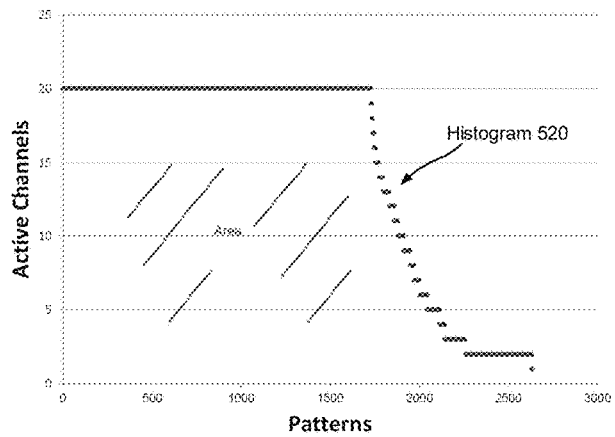
FIG. 5 illustrates an example of pattern counts, number of used channels (active input channels), and data volumes for an industrial design with 20 input channels for EDT-based compression.

Refer back to the flowchart 400 in FIG. 4. In operation 430, the test pattern count prediction unit 320 determines a test pattern count for each of a plurality of input channel numbers based on the compressed test patterns for the one or two input channel numbers, a number of active input channels for each of the compressed test patterns, and an assumption of similar input data volumes for different numbers of input channels. FIG. 5 illustrates an example of pattern counts, number of used channels (active input channels), and data volumes for an industrial design with 20 input channels for EDT-based compression. The figure includes a table 510 and a channel-pattern histogram curve 520. Columns 1, 2 and 3 of the table 510 are for the number of active input channels, pattern count, and input data volume, respectively. The input data volume is a product of the number of active input channels and the count of test patterns using this number of input channels. Note that the data volume does not consider the constant shift length per pattern. For example, 2 test patterns use just one input channel and 374 test patterns use 2 input channels. The area enclosed by the channel-pattern histogram curve 520 represents the total data volume at the input side.

Figure 6:
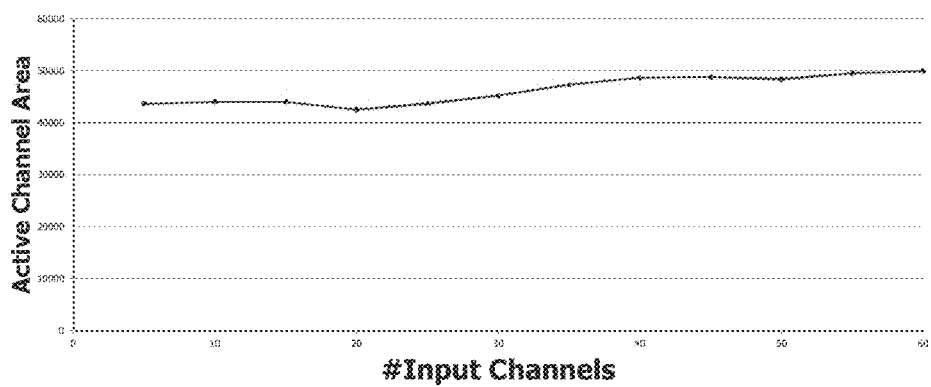
FIG. 6 illustrates a curve of input data volume vs. number of input channels for the industrial design used in FIG. 5.

FIG. 6 illustrates a curve of input data volume vs. number of input channels for the industrial design used in FIG. 5. The input data volumes for different numbers of input channels are obtained based on full test pattern generation and encoding processes (using a set of faults to achieve a targeted test coverage). Each of the input data volumes is a sum over products of the number of input channels and the corresponding active input channel numbers. Within a reasonable range of input channel numbers, such as from 1 to 25, the input data volume is almost a constant. Rather than performing a full test pattern generation and encoding process for each input channel number, the test pattern count prediction unit 320 can predict patterns counts for some input channel numbers assuming that the input data volumes are similar for different input channel numbers.

Figure 7:
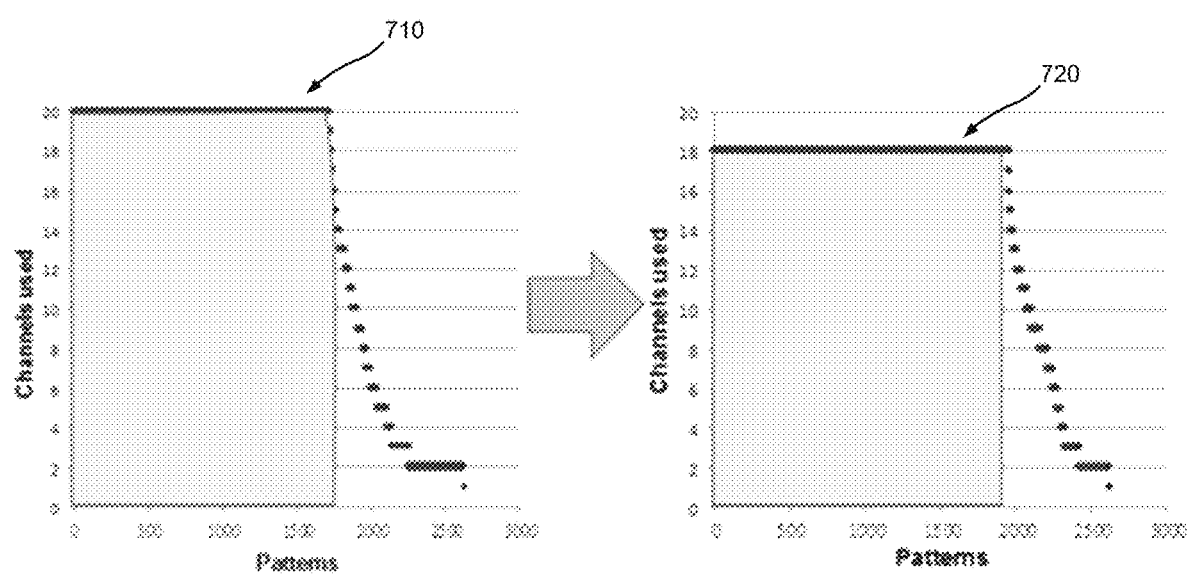
FIG. 7 illustrates an example of predicting a pattern count for 18 input channels from the pattern count for 20 input channels.

FIG. 7 illustrates an example of predicting a pattern count for 18 input channels from the pattern count for 20 input channels. A channel-pattern curve 710 for 20 input channels is obtained based on performing a full test pattern generation and encoding process, while a channel-pattern curve 720 for 18 input channels is predicted based on the channel-pattern curve 710. The area enclosed under the channel-pattern curve 710 for 20, 19 and 18 active input channels is assumed to be equal to the area enclosed under the channel-pattern curve 720 for 18 active input channels. Assuming the pattern count using 20, 19, 18 input channels are 1700, 20 and 10 respectively, the area under the channel-pattern curve 710 for 20, 19 and 18 active input channels can be calculated with 20*1700+19*20+18*10=34560. The pattern count using 18 input channels can then be calculated as 34560/18=1920. The number of additional patterns=1920−(1700+

20+10)=190. That is to say, when changing the input channels from 20 to 18, 190 more patterns are needed.

The prediction bases on pattern data for the maximum allowable number of input channels (M) can be summarized as:

$$\text{Pat\_Count}_E = \frac{1}{E}\left(\sum_{i=E}^{M} IDV_i\right) + \sum_{i=1}^{E-1} pat_i \quad (1)$$

where $IDV_i$ and $pat_i$ represent the corresponding input data volume and the number of patterns with input channel count i, respectively, and E is the input channel number.

The prediction bases on pattern data for the minimum acceptable number of input channels (N) can be summarized as:

$$\text{Pat.\_Count}_E = \frac{1}{E}(IDV_N) + \sum_{i=1}^{N-1} pat_i \quad (2)$$

Figure 8:
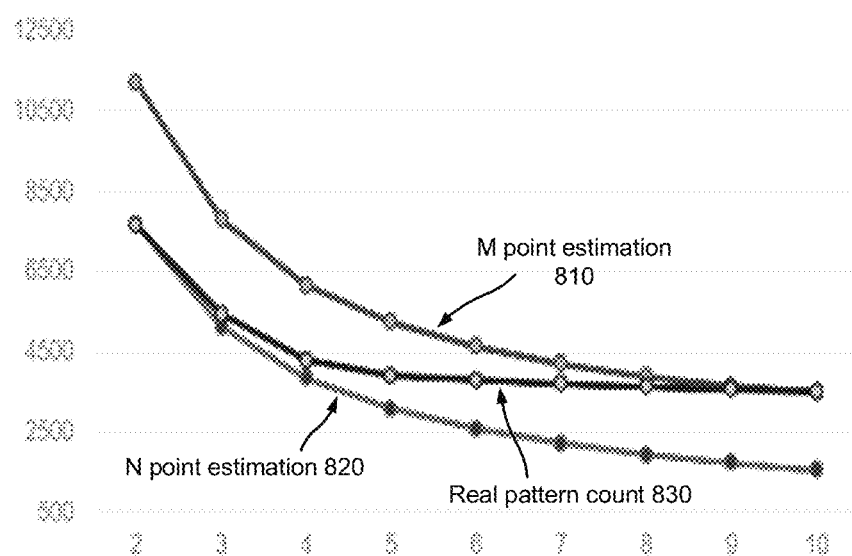
FIG. 8 illustrates an example of pattern count curves derived based on the maximum allowable number of input channels, the minimum acceptable number of input channels, and by performing pattern generation and encoding processes, respectively.

FIG. 8 illustrates an example of pattern count curves derived based on the maximum allowable number of input channels (810), the minimum acceptable number of input channels (820), and by performing pattern generation and encoding processes (830), respectively. The figure shows that the real pattern count curve 830 is bounded between the two predicted pattern count curves 810 and 820.

The test pattern count prediction unit 320 may perform a curve fitting method based on the two predicted pattern count curves 810 and 820 to estimate the real pattern count curve 830. One curve fitting method is based on linearly proportional weights:

$$\text{Pat.Count}_{Est.} = \text{Max}\left(LB, \frac{(A_2 - E)*\#Pat_{E1} + (E - A_1)*\#Pat_{E2}}{A_2 - A_1}\right) \quad (3)$$

where $A_1$, $A_2$ and E represent input channel counts at start-point, end-point and estimated point, respectively. $\#Pat_{E1}$ and $\#Pat_{E2}$ respectively represent the estimated pattern counts at the estimated points obtained at the start-point and end-point estimations, i.e., Equations (1) and (2), respectively. LB is a lower bound as explained next. Typically, when increasing the number of input channels, the corresponding pattern count would reduce and then saturate even if we provide a quite large input channel count. Thus, the pattern count obtained by the end-point ATPG is treated as the lower bound LB during the estimation.

For the case where the input data volume decreases as the input channel count increases, the estimation error based on Equation (3) may be relatively larger than the case when the input data volume increases as the input channel count increases. The test pattern count prediction unit 320 may adopt some pre-processing procedure before using Equation (2) for the N-point-based estimation. FIG. 9 illustrates an example of such a pre-processing procedure. In step 910, the test pattern count prediction unit 320 treats the input data volume variation among the considered range as a linear variation and use linear interpolation to deduce the input data volume at the estimated input channel counts. For instance, assume the maximum allowable number of input channels M is 11, the total data volume at M-point $TIDV_E$ is 34684, the minimum acceptable number of input channels N is 3 and the total data volume at the N-point $TIDV_S$ is 77409. To infer the estimated pattern count with 5 input channels, the test pattern count prediction unit 320 deduces its total input data volume to be 77409−((5−3)*(77409−34684)/(11−3))=66727 by using linear interpolation. In step 920, after the total input data volume has been deduced, the test pattern count prediction unit 320 redistributes the data volume to each specific input channel count based on its original data volume proportion. For example, when the number of used input channels is 3, the data volume is calculated as 66727*99.845%=66624. In step 930, the number of patterns using a specific number of channels is recalculated by dividing the data volume by the number of used channels.

Alternatively, the test pattern count prediction unit 320 can use results of one full test pattern generation and encoding process and two fault-sampling test pattern generation and encoding processes to predict pattern counts. The trend of the pattern count-input channel number curve derived using pattern generation and encoding processes is quite similar to the trend derived using fault-sampling test pattern generation and encoding processes such as those based on 10% sampled faults. The test pattern count prediction unit 320 may first perform a pattern generation and encoding process with a full fault list for the maximum allowable number of input channels and find out the pattern count variation trend through two fault sampling-based pattern generation and encoding process for the maximum allowable number of input channels and the minimum acceptable number of input channels the end points, respectively. The pattern count curve with fault sampling is then scaled into one without fault sampling based on the ratio of pattern counts for the maximum allowable number of input channels with and without fault sampling. This procedure may reduce more than 40% CPU runtime with only a slight sacrifice in accuracy.

Refer back to the flowchart 400 in FIG. 4. In operation 440, the test compression analyzer 300 then stores the test pattern count for each of the plurality of input channel numbers and test pattern counts for the one or two input channel numbers in the output database 355. Optionally in operation 450, the input channel determination unit 330 can determine input channel number for the circuit design based on the test pattern count for each of the plurality of input channel numbers and the test pattern counts for the one or two input channel numbers. The input channel determination unit 330 may search for an input channel number having a low pattern count. While the disclosed technology has been described with respect to EDT-based compression, those skilled in the art will appreciate that the disclosed technology may be applicable to other test compression techniques.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A method, executed by at least one processor of a computer, comprising:
   receiving a circuit design;
   performing one, two, or three test pattern generation and encoding processes for the circuit design to generate compressed test patterns for one or two input channel numbers, the one, two, or three test pattern generation and encoding processes configured to minimize active input channels for each of the compressed test patterns;
   determining a test pattern count for each of a plurality of input channel numbers based on the compressed test patterns for the one or two input channel numbers, a number of active input channels for each of the compressed test patterns, and an assumption of similar input data volumes for different numbers of input channels; and
   storing the test pattern count for each of the plurality of input channel numbers.

2. The method recited in claim 1, further comprising:
   determining input channel number for the circuit design based on the test pattern count for each of the plurality of input channel numbers and test pattern counts for the one or two input channel numbers.

3. The method recited in claim 1, wherein the one, two, or three test pattern generation and encoding processes comprise two test pattern generation and encoding processes using a set of faults to achieve a targeted test coverage for two input channel numbers, respectively.

4. The method recited in claim 3, wherein the two input channel numbers are a maximum allowable number of input channels and a minimum acceptable number of input channels.

5. The method recited in claim 4, wherein the minimum acceptable number of input channels is derived based on a statistical analysis of the specified bits while performing the pattern generation and encoding process for the maximum allowable number of input channels.

6. The method recited in claim 1, wherein the one, two, or three test pattern generation and encoding processes may comprise one test pattern generation and encoding process using a set of faults to achieve a targeted test coverage for a first input channel number and two test pattern generation and encoding processes for a subset of faults selected from the set of faults for the first input channel number and a second input channel number, respectively.

7. The method recited in claim 6, wherein the first input channel number is a maximum allowable number of input channels and the second input channel number is the minimum acceptable number of input channels.

8. The method recited in claim 1, wherein the compressed test patterns are encoded for EDT (embedded deterministic test)-based decompressors.

9. One or more non-transitory computer-readable media storing computer-executable instructions for causing one or more processors to perform a method, the method comprising:
   receiving a circuit design;
   performing one, two, or three test pattern generation and encoding processes for the circuit design to generate compressed test patterns for one or two input channel numbers, the one, two, or three test pattern generation and encoding processes configured to minimize active input channels for each of the compressed test patterns;
   determining a test pattern count for each of a plurality of input channel numbers based on the compressed test patterns for the one or two input channel numbers, a number of active input channels for each of the compressed test patterns, and an assumption of similar input data volumes for different numbers of input channels; and
   storing the test pattern count for each of the plurality of input channel numbers.

10. The one or more non-transitory computer-readable media recited in claim 9, wherein the method further comprise:
    determining input channel number for the circuit design based on the test pattern count for each of the plurality of input channel numbers and test pattern counts for the one or two input channel numbers.

11. The one or more non-transitory computer-readable media recited in claim 9, wherein the one, two, or three test pattern generation and encoding processes comprise two test pattern generation and encoding processes using a set of faults to achieve a targeted test coverage for two input channel numbers, respectively.

12. The one or more non-transitory computer-readable media recited in claim 11, wherein the two input channel numbers are a maximum allowable number of input channels and a minimum acceptable number of input channels.

13. The one or more non-transitory computer-readable media recited in claim 12, wherein the minimum acceptable number of input channels is derived based on a statistical analysis of the specified bits while performing the pattern generation and encoding process for the maximum allowable number of input channels.

14. The one or more non-transitory computer-readable media recited in claim 9, wherein the one, two, or three test pattern generation and encoding processes may comprise one test pattern generation and encoding process using a set of faults to achieve a targeted test coverage for a first input channel number and two test pattern generation and encoding processes for a subset of faults selected from the set of faults for the first input channel number and a second input channel number, respectively.

15. The one or more non-transitory computer-readable media recited in claim 14, wherein the first input channel number is a maximum allowable number of input channels and the second input channel number is the minimum acceptable number of input channels.

16. The one or more non-transitory computer-readable media recited in claim 9, wherein the compressed test patterns are encoded for EDT (embedded deterministic test)-based decompressors.

17. A system, comprising:
    one or more processors, the one or more processors programmed to perform a method, the method comprising:
    receiving a circuit design;
    performing one, two, or three test pattern generation and encoding processes for the circuit design to generate compressed test patterns for one or two input channel numbers, the one, two, or three test pattern generation and encoding processes configured to minimize active input channels for each of the compressed test patterns;
    determining a test pattern count for each of a plurality of input channel numbers based on the compressed test patterns for the one or two input channel numbers, a number of active input channels for each of the compressed test patterns, and an assumption of similar input data volumes for different numbers of input channels; and storing the test pattern count for each of the plurality of input channel numbers.

18. The system recited in claim 17, wherein the one, two, or three test pattern generation and encoding processes comprise two test pattern generation and encoding processes using a set of faults to achieve a targeted test coverage for two input channel numbers, respectively.

19. The system recited in claim 18, wherein the two input channel numbers are a maximum allowable number of input channels and a minimum acceptable number of input channels.

20. The system recited in claim 17, wherein the one, two, or three test pattern generation and encoding processes may comprise one test pattern generation and encoding process using a set of faults to achieve a targeted test coverage for a first input channel number and two test pattern generation and encoding processes for a subset of faults selected from the set of faults for the first input channel number and a second input channel number, respectively.

21. The system recited in claim 20, wherein the first input channel number is a maximum allowable number of input channels and the second input channel number is the minimum acceptable number of input channels.

22. The system recited in claim 17, wherein the compressed test patterns are encoded for EDT (embedded deterministic test)-based decompressors.

\* \* \* \* \*